(12) United States Patent
Tsubakihara

(10) Patent No.: US 6,434,162 B1
(45) Date of Patent: Aug. 13, 2002

(54) PCM DATA OUTPUTTING METHOD AND PCM DATA OUTPUT DEVICE ENABLING OUTPUT OF PCM GROUP INFORMATION AND PCM DATA CORRECTLY CORRELATED WITH EACH OTHER

(75) Inventor: Masahiro Tsubakihara, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/295,432

(22) Filed: Apr. 20, 1999

(30) Foreign Application Priority Data

Apr. 20, 1998 (JP) .......................................... 10-109742

(51) Int. Cl.[7] .......................... H04L 12/54; G10L 19/00
(52) U.S. Cl. .......................... 370/428; 704/230; 386/96
(58) Field of Search ................................ 704/500, 230; 370/428, 389, 412–419, 509, 429; 386/96; 348/14.11, 472

(56) References Cited

U.S. PATENT DOCUMENTS 5,517,250 A * 5/1996 Hoogenboom et al. .. 348/390.1
6,167,192 A * 12/2000 Heo ........................... 386/105
6,310,652 B1 * 10/2001 Li et al. ..................... 348/515

FOREIGN PATENT DOCUMENTS

JP            5-282785         4/1999

* cited by examiner

Primary Examiner—Dang Ton
Assistant Examiner—Henry Baron
(74) Attorney, Agent, or Firm—Scully, Scott, Murphy & Presser

(57) ABSTRACT

A PCM data outputting method of receiving input of a data stream of PCM packets to output PCM data which includes the steps of receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting PCM group information from said header, writing PCM data into a PCM buffer, as well as generating an address in the PCM buffer at which PCM data at the head of the PCM group is written, and based on a group head address, reading PCM data from the PCM buffer and externally outputting the data together with PCM group information.

13 Claims, 4 Drawing Sheets

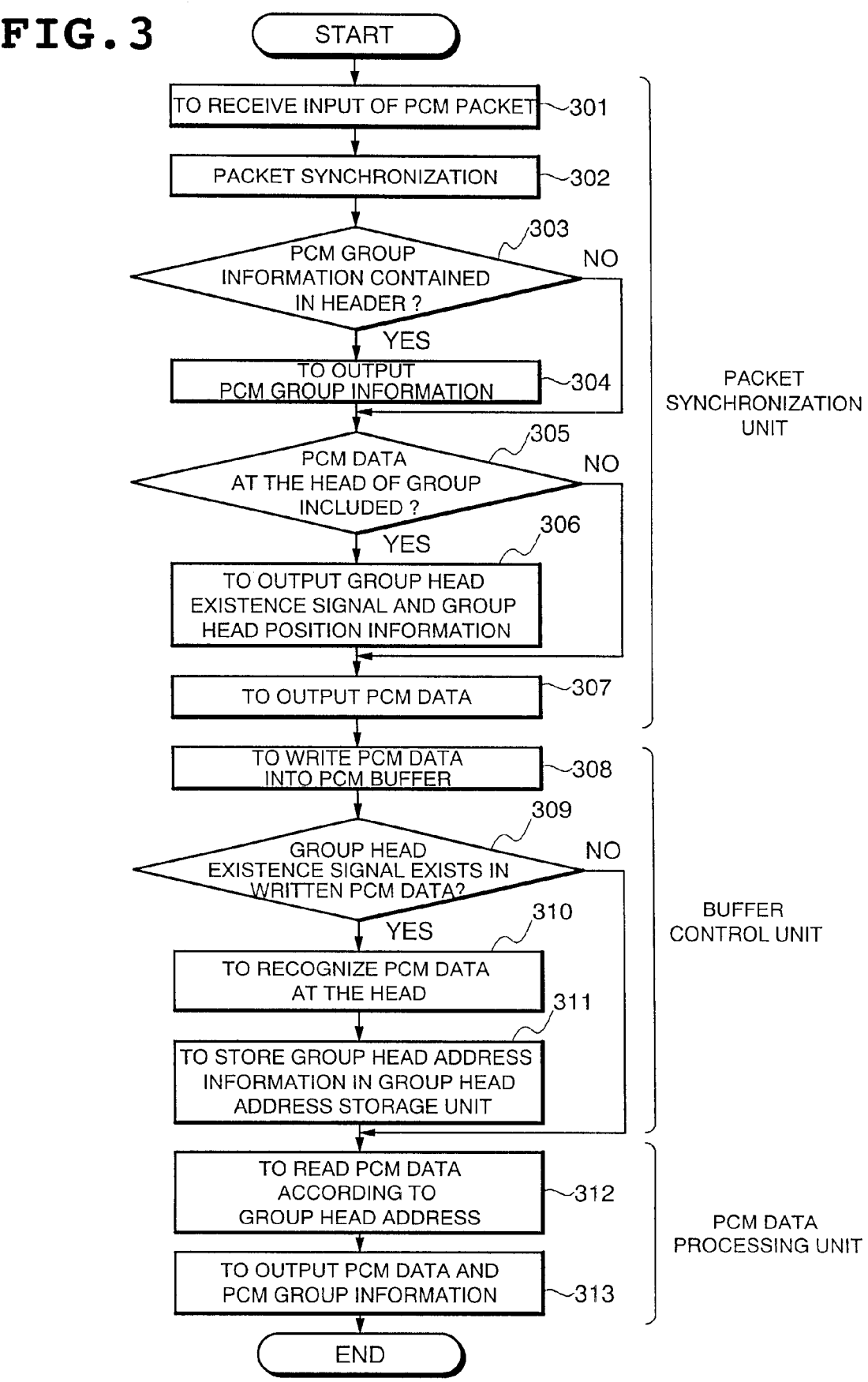

PCM DATA OUTPUTTING METHOD AND PCM DATA OUTPUT DEVICE ENABLING OUTPUT OF PCM GROUP INFORMATION AND PCM DATA CORRECTLY CORRELATED WITH EACH OTHER

BACKGROUND OF THE INVENTION

1. Field of the Invention

The present invention relates to a PCM data outputting method and a PCM data output device and, more particularly, to a PCM data outputting method and a PCM data output device enabling output of PCM group information and PCM data correctly correlated with each other.

2. Description of the Related Art

In a storage-type medium such as DVD (Digital Video Disc) and a communication-type medium such as STB (Set Top Box), voice information is transmitted together with image. It is a common practice for voice data to be compressed as is representatively done in MPEG for the purpose of reducing storage and communication capacities. Compression, however, inevitably causes quantizing noise because of the principle of voice compression and in media giving importance to tone quality, therefore, non-compressed PCM voice is employed.

Since in a compressed stream in MPEG or the like, information including a sampling frequency is recorded, extracting and processing the information at a decoding block enables proper PCM data to be decoded. On the other hand, in the transmission of PCM data, since PCM data in itself has none of information including a sampling frequency, the information is added to each transmission packet. It is crucial to correctly correlate PCM information recorded in a transmission packet and PCM data itself.

An example of a conventional PCM data output device is shown in FIG. 6. In this PCM data output device, a packet synchronization unit 110 provides packet synchronization of applied PCM packets to output PCM data grouped into a plurality of data to a buffer control unit 120 and the output plurality of PCM data is written into a PCM buffer 140 by the buffer control unit 120. In addition, a PCM data processing unit 150 reads and externally outputs data written in the PCM buffer 140 based on PCM group information applied from the packet synchronization unit 110.

In the PCM data output device illustrated in FIG. 6, since correlation between PCM group information (sampling frequency and bit length) output from the packet synchronization unit 110 and PCM data written to the buffer control unit 120 and read from the PCM buffer 140 involves a discrepancy, there exists a period when the PCM data processing unit 150 fails to accurately provide PCM output.

Another example of conventional art is a technique disclosed in Japanese Patent Laying-Open No. 5-282785. The system disclosed in Japanese Patent Laying-Open No. 5-282785 limits its application only to reproduction of CD (Compact Disc) to adjust a time base of a PCM data part with reference to a sub-code at the head of each frame. Since this system specializes on CD to have other information than time (the number of quantizing bits, sampling frequency, etc.) as fixed values, it fails to follow PCM data for which these information is variable and accordingly disables PCM group information and PCM data to be correctly correlated with each other.

SUMMARY OF THE INVENTION

An object of the present invention is to provide a PCM data outputting method and a PCM data output device enabling PCM group information and PCM data to be correctly correlated with each other at any time to accurately provide PCM output.

According to the first aspect of the invention, a PCM data outputting method of receiving input of a data stream of PCM packets to output PCM data, comprising the steps of receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting PCM group information from the header, writing the PCM data into a PCM buffer, generating an address in the PCM buffer at which PCM data at the head of the PCM group is written, and based on the address, reading PCM data from the PCM buffer and externally outputting the data together with the PCM group information.

In the preferred construction, the PCM data outputting method further comprising the steps of when PCM data at the head of the PCM group is included in a predetermined number of PCM data to be written into the PCM buffer, outputting position information indicative of a position of the PCM data at the head in the predetermined number of PCM data, and recognizing the PCM data at the head from the position information.

In another preferred construction, the PCM data outputting method further comprising the steps of when PCM data at the head of the PCM group is included in a predetermined number of PCM data to be written into the PCM buffer, outputting an existence signal indicative of the existence of the PCM data at the head and position information indicative of a position of the PCM data at the head in the predetermined number of PCM data at the same timing as that of the output of the predetermined number of PCM data in question, and when the existence signal is output, recognizing the PCM data at the head from the then the position information.

In another preferred construction, the PCM data outputting method further comprising the steps of receiving input of the PCM data stream and at the same timing as that of packet synchronization, determining whether the PCM group information is contained in the header, and determining whether PCM data at the head of the PCM group is included in a predetermined number of PCM data to be written into the PCM buffer.

In another preferred construction, the PCM data outputting method further comprising the steps of receiving input of the PCM data stream and at the same timing as that of packet synchronization, determining whether the PCM group information is contained in the header, determining whether PCM data at the head of the PCM group is included in a predetermined number of PCM data to be written into the PCM buffer, when PCM data at the head of the PCM group is included in a predetermined number of PCM data to be written into the PCM buffer, outputting an existence signal indicative of the existence of the PCM data at the head and position information indicative of a position of the PCM data at the head in the predetermined number of PCM data at the same timing as that of the output of the predetermined number of PCM data in question, and when the existence signal is output, recognizing the PCM data at the head from the then the position information.

According to the second aspect of the invention, a PCM data output device which receives input of a data stream of PCM packets to output PCM data, comprises packet synchronization means for receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting, from a header containing PCM group information, the PCM group information, buffer control means for sequentially writing PCM data output from the packet synchronization means into the PCM buffer and generating an address in the PCM buffer at which PCM data at the head of the PCM group is written, and PCM data processing means for reading PCM data from the PCM buffer based on the address and externally outputting the data together with the PCM group information.

In the preferred construction, the packet synchronization means, when PCM data at the head of the PCM group is included in a predetermined number of PCM data, outputs position information indicative of a position of the PCM data at the head in the predetermined number of PCM data at the same timing as that of the output of the predetermined number of PCM data in question, the buffer control means recognizes the PCM data at the head from the position information output from the packet synchronization means and generating an address of the PCM buffer at which the PCM data at the head is written in the PCM buffer, and based on PCM group information output from the packet synchronization means, the PCM data processing means reads the PCM data of the PCM group from the PCM buffer according to the address.

In another preferred construction, the PCM data output device further comprises address storage means for storing the address, wherein
the buffer control means stores, in the address storage means, an address of the PCM buffer at which PCM data at the head is written in the PCM buffer in correlation with the PCM group as head address information, and the PCM data processing means obtains, based on PCM group information output from the packet synchronization means, the corresponding head address information from the address storage means and reads the PCM data from the PCM buffer according to the address.

In another preferred construction, the packet synchronization means, when PCM data at the head of a PCM group is included in a predetermined number of PCM data, outputs an existence signal indicative of the existence of the PCM data at the head and position information indicative of a position of the PCM data at the head in the predetermined number of PCM data at the same timing as that of the output of the predetermined number of PCM data in question, the buffer control means, when the existence signal is output, recognizes the PCM data at the head from the then the position information and generates an address of the PCM buffer at which the PCM data at the head is written in the PCM buffer, and based on PCM group information output from the packet synchronization means, the PCM data processing means reads the PCM data of the PCM group from the PCM buffer according to the address.

In another preferred construction, the PCM data output device further comprises address storage means for storing the address, wherein
the packet synchronization means, when PCM data at the head of a PCM group is included in a predetermined number of PCM data, outputs an existence signal indicative of the existence of the PCM data at the head and position information indicative of a position of the PCM data at the head in the predetermined number of PCM data at the same timing as that of the output of the predetermined number of PCM data in question, the buffer control means, when the existence signal is output, recognizes the PCM data at the head from the then the position information, generates an address of the PCM buffer at which the PCM data at the head is written in the PCM buffer and stores, in the address storage means, the address in correlation with the PCM group as head address information, and the PCM data processing means obtains, based on PCM group information output from the packet synchronization means, the corresponding head address information from the address storage means and reads the PCM data from the PCM buffer according to the address.

According to another aspect of the invention, a computer readable memory which stores a PCM data output program for receiving input of a data stream of PCM packets to output PCM data, the PCM data output program comprising the steps of receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting PCM group information from the header, writing the PCM data into a PCM buffer, generating an address in the PCM buffer at which PCM data at the head of the PCM group is written, and based on the group head address, reading PCM data from the PCM buffer and externally outputting the data together with the PCM group information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a flow chart for use in explaining operation of the PCM data output device according to one embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
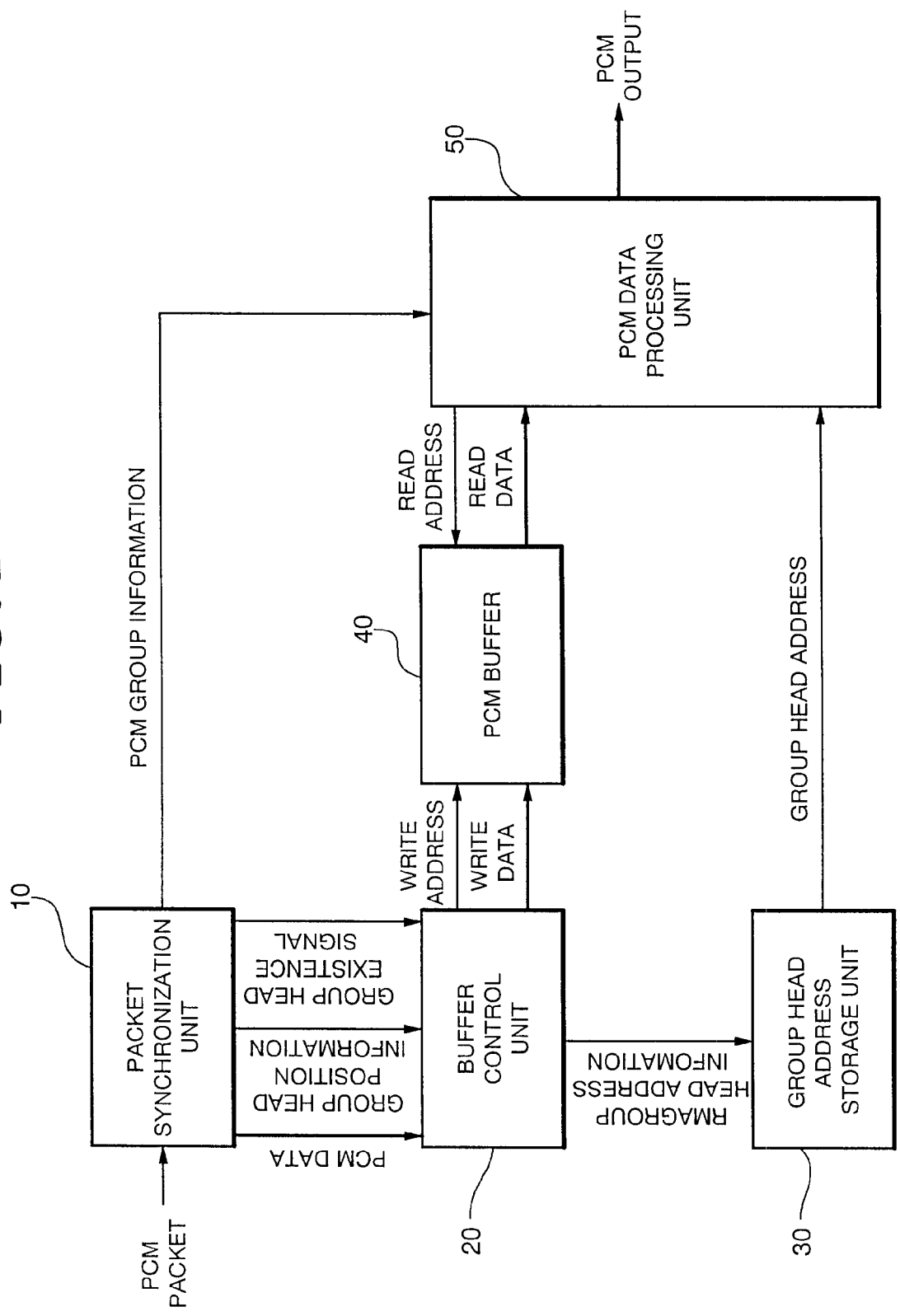
FIG. 1 is a block diagram showing structure of a PCM data output device according to one embodiment of the present invention.

FIG. 1 is a block diagram for use in explaining structure of a PCM data output device according to an embodiment of the present invention.

With reference to FIG. 1, the PCM data output device according to one embodiment of the present invention includes a packet synchronization unit 10, a buffer control unit 20, a group head address storage unit 30, a PCM buffer 40 and a PCM data processing unit 50.

The packet synchronization unit 10 receives input of a data stream of PCM packets and provides packet synchronization of the same to output PCM data grouped into a plurality of data to the buffer control unit 20. In addition, when a header of a packet contains PCM group information (sampling frequency and bit length), the packet synchronization unit 10 outputs the PCM group information to the PCM data processing unit 50 and when PCM data to be output include PCM data at the head of a PCM group, further outputs, to the buffer control unit 20, a group head existence signal and group head position information indicative of a position of PCM data at the head of a plurality of PCM data to be output.

The buffer control unit 20 sequentially writes PCM data output from the packet synchronization unit 10 into the PCM buffer 40 and when a group head existence signal is output on this occasion, recognizes PCM data at the head from the group head position information and stores, in the group head address storage unit 30, group head address information which correlates an address in the PCM buffer 40 at which the PCM data at the head is written with the PCM group.

The PCM buffer 40 temporarily holds the PCM data written by the buffer control unit 20 before reading processing is started by the PCM data processing unit 50.

The PCM data processing unit 50 receives input of PCM group information from the packet synchronization unit 10 to read PCM data according to a group head address stored at the group head address storage unit 30, as well as externally outputting the PCM group information together with the read PCM data.

Figure 2:
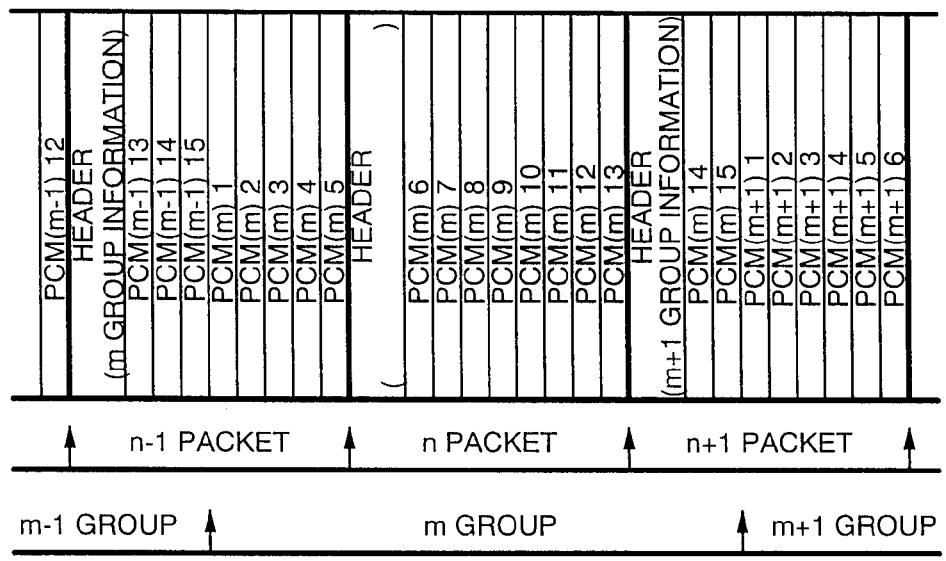
FIG. 2 is a diagram showing an example of PCM data arrangement.

A non-compressed PCM stream of a voice data part stored in a DVD or the like has such arrangement as illustrated in FIG. 2. With respect to a packet, it is a common practice to select a length suited for each recording and transfer system. In addition, PCM data has one group made up of a plurality of data (15 data in FIG. 2).

Therefore, a packet length and a PCM group length do not always coincide with each other, which causes a discrepancy between a packet and a PCM group as illustrated in FIG. 2. In other words, there arises a state where a plurality of PCM groups exist in one packet.

Each PCM group needs information such as a bit length and a sampling frequency (hereinafter, referred to as PCM group information) and the PCM group information is recorded in a header of each packet.

In FIG. 2, recorded in the header of an n−1 packet is information of an m group and in the header of an n+1 packet is information of an m+1 group. It is therefore crucial to accurately transmit, based on PCM group information recorded in the header of a packet, data of a PCM group corresponding to the group in question to the PCM processing system at a succeeding stage, starting with data at the head.

Next, description will be made of operation of thus structured PCM data output device of the present embodiment with reference to the flow chart of FIG. 3.

When such a PCM data stream is applied to the packet synchronization unit 10 as illustrated in FIG. 2 in which PCM groups each made up of a plurality of PCM data are divided into a plurality of successive packets and in a header of a packet to which PCM data at the head of each PCM group belongs, PCM group information of the PCM group in question is contained (Step 301), the packet synchronization unit 10 provides packet synchronization to put the PCM data together into groups each made up of a predetermined number of a plurality of PCM data (Step 302) and when the header contains PCM group information (Step 303), outputs the PCM group information to the PCM data processing unit 50 (Step 304).

In addition, the packet synchronization unit 10 determines whether the PCM data grouped into a predetermined number of a plurality of data include PCM data at the head of a group (Step 305) and when the PCM data at the head is included, outputs, to the buffer control unit 20, a group head existence signal GHS indicating that PCM data at the head of the group exists and group head position information indicative of a position of the PCM data at the head in question in the PCM data grouped into a predetermined number of a plurality of data (Step 306).

The packet synchronization unit 10 also outputs the PCM data grouped into a predetermined number of a plurality of data to the buffer control unit 20 (Step 307). In a case where the above-described group head existence signal GHS and the group head position information are output, the unit 10 outputs PCM data at the same timing as that of the former output.

Figure 4:
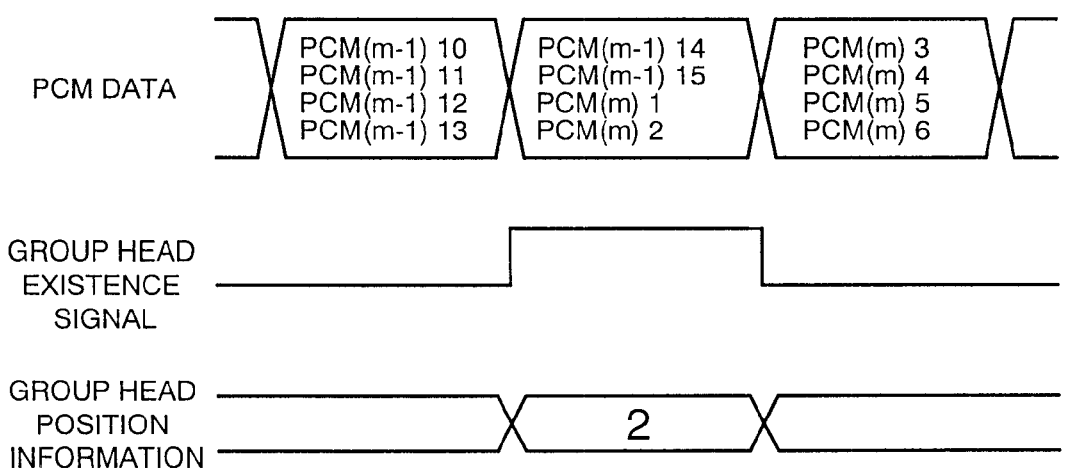
FIG. 4 is a diagram showing a relationship among PCM data, a group head existence signal and group head position information.

For reducing a transfer time, a plurality of PCM data is transferred in the lump in general (four PCM data in FIG. 4). In FIG. 4, since PCM data ((m)1) falls on the head of a PCM group (m), the packet synchronization unit 10 brings the group head existence signal GHS to an active state at the transfer timing to include the PCM data ((m)1).

The packet synchronization unit 10 further outputs group head position information for defining the position of the PCM data ((m)1). In FIG. 4, since the PCM data ((m)1) is the third data of the four PCM data grouped into one, "2" is output as the group head position information. As to four PCM data grouped into one, "0, 1, 2, 3" are set as position information in this order, starting from the first data.

The buffer control unit 20 sequentially writes the PCM data grouped into a plurality of data which is output from the packet synchronization unit 10 into the PCM buffer 40 (Step 308).

At that time, if the above-described group head existence signal GHS is active with respect to the written PCM data grouped into a plurality of data (Step 309), the buffer control unit 20 recognizes PCM data at the head of a group among the PCM data grouped into a plurality of data based on the above-described group head position information (Step 310).

Then, at the writing of the PCM data into the PCM buffer 40, the buffer control unit 20 stores, in the group head address storage unit 30, the group head address information which correlates an address in the PCM buffer 40 at which the PCM data at the head of the group is written with the PCM group (Step 311).

Figure 5:
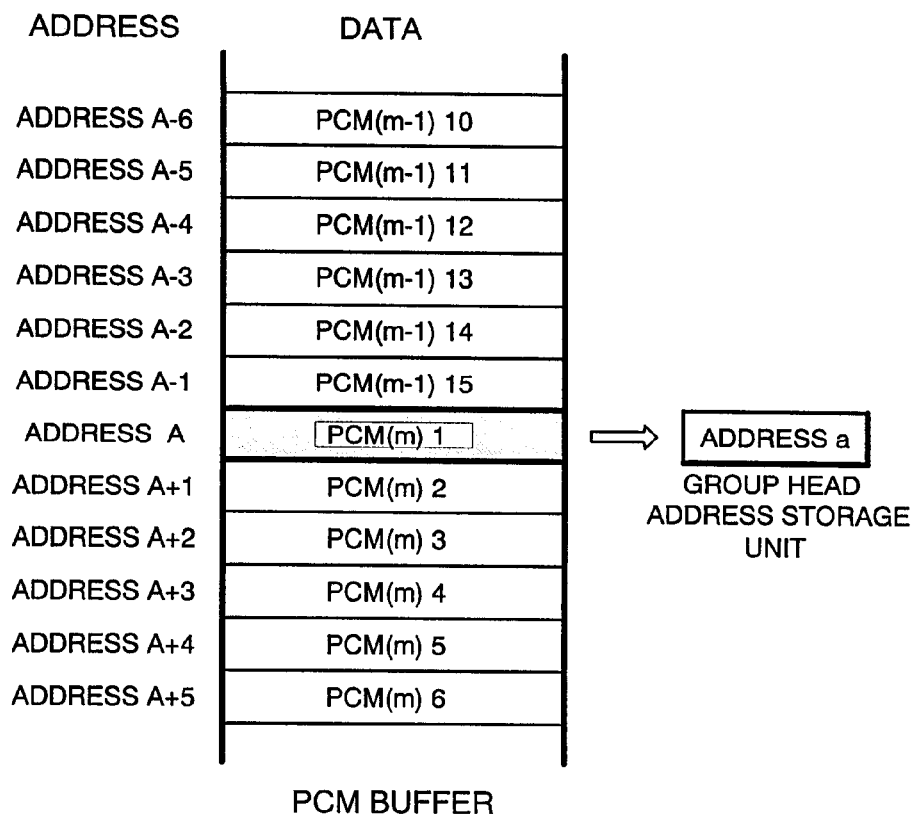
FIG. 5 is a diagram showing group head addresses to be stored in a group head address storage unit 30.
Figure 6:
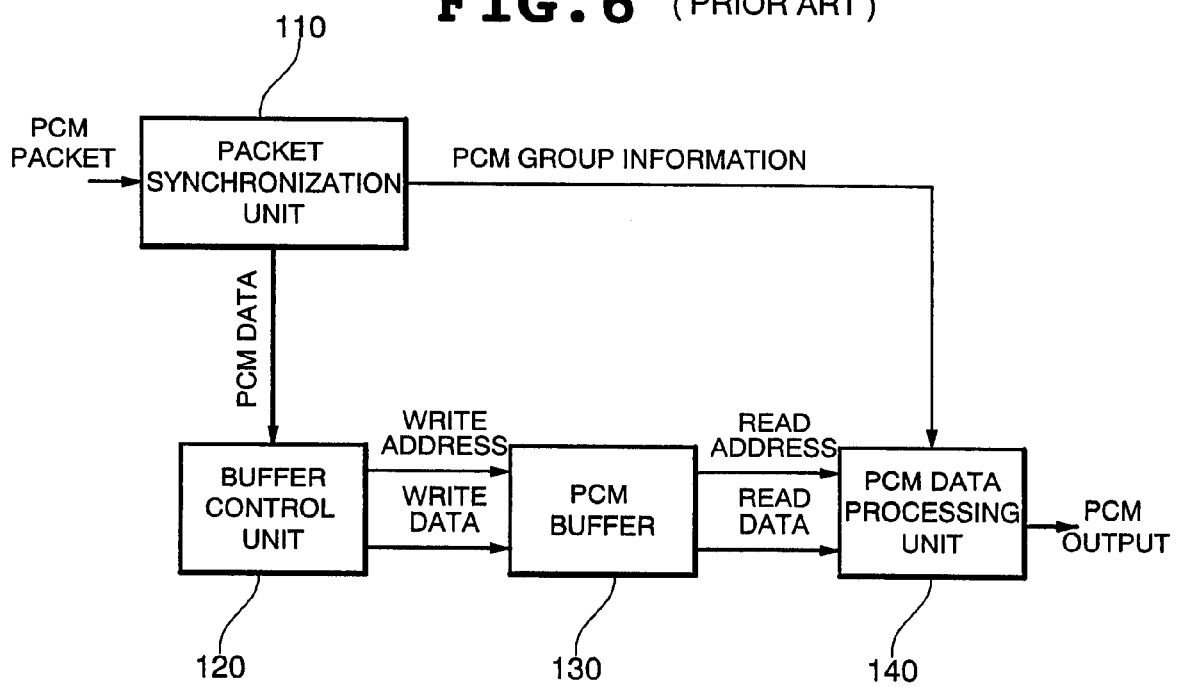
FIG. 6 is a block diagram showing an example of a conventional PCM data output device.

In FIG. 5, since the PCM data PCM ((m)1) at the head of the PCM group (m) is written at an address "a" in the PCM buffer 40, the address "a" of the PCM data PCM((m)1) at the head of the PCM group (m) is stored in correlation with the PCM group (m) in the group head address storage unit 30.

The PCM data processing unit 50 reads, based on the PCM group information output from the packet synchronization unit 10, a group head address of the PCM data at the head of the PCM data belonging to the PCM group in question from the group head address storage unit 30 and reads the PCM data of the PCM group from the PCM buffer 40 according to the read address (Step 312).

Furthermore, the PCM data processing unit 50 externally outputs the above-described read PCM data together with the PCM group information (Step 313).

By thus reading a group head address of PCM data at the head of a PCM group from the group head address storage unit 30, the PCM data output device according to the present embodiment reads PCM data from the PCM buffer 40 in accordance with the group head address and outputs the data together with PCM group information, thereby enabling the PCM group information and the PCM data to be correctly correlated with each other.

In the PCM data outputting method of the present invention, the packet synchronization unit 10, the buffer control unit 20, the PCM data processing unit 50 and other functions can be realized not only by hardware but also by loading a computer program having the respective functions into a memory of a computer processing device. The computer program is stored in a magnetic disc, a semiconductor memory or other recording medium. Then, loading the computer program from the recording medium into the computer processing device to control operation of the computer processing device also realizes the above-described respective functions.

As described in the foregoing, since the present invention enables PCM group information and PCM data to be correctly correlated with each other at any time to provide accurate PCM output, no noise will be generated at the time of voice output.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A PCM data outputting method of receiving input of a data stream of PCM packets to output PCM data, comprising the steps of:

receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting PCM group information from said header;

writing said PCM data into a PCM buffer;

generating an address in said PCM buffer at which PCM data at the head of said PCM group is written; and based on said address, reading PCM data from said PCM buffer and externally outputting the data together with said PCM group information.

2. The PCM data outputting method as set forth in claim 1, further comprising the steps of when PCM data at the head of said PCM group is included in a predetermined number of PCM data to be written into said PCM buffer, outputting position information indicative of a position of said PCM data at the head in the predetermined number of PCM data, and recognizing said PCM data at the head from said position information.

3. The PCM data outputting method as set forth in claim 1, further comprising the steps of when PCM data at the head of said PCM group is included in a predetermined number of PCM data to be written into said PCM buffer, outputting an existence signal indicative of the existence of said PCM data at the head and position information indicative of a position of said PCM data at the head in the predetermined number of PCM data at the same timing as that of the output of the predetermined number of PCM data in question, and when said existence signal is output, recognizing said PCM data at the head from the then said position information.

4. The PCM data outputting method as set forth in claim 1, further comprising the steps of receiving input of said PCM data stream and at the same timing as that of packet synchronization, determining whether said PCM group information is contained in said header, and determining whether PCM data at the head of said PCM group is included in a predetermined number of PCM data to be written into said PCM buffer.

5. The PCM data outputting method as set forth in claim 1, further comprising the steps of:

receiving input of said PCM data stream and at the same timing as that of packet synchronization, determining whether said PCM group information is contained in said header, determining whether PCM data at the head of said PCM group is included in a predetermined number of PCM data to be written into said PCM buffer, when PCM data at the head of said PCM group is included in a predetermined number of PCM data to be written into said PCM buffer, outputting an existence signal indicative of the existence of said PCM data at the head and position information indicative of a position of said PCM data at the head in the predetermined number of PCM data at the same timing as that of the output of the predetermined number of PCM data in question, and when said existence signal is output, recognizing said PCM data at the head from the then said position information.

6. A PCM data output device which receives input of a data stream of PCM packets to output PCM data, comprising:

packet synchronization means for receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting, from a header containing PCM group information, the PCM group information;

buffer control means for sequentially writing PCM data output from said packet synchronization means into said PCM buffer and generating an address in said PCM buffer at which PCM data at the head of said PCM group is written; and PCM data processing means for reading PCM data from said PCM buffer based on said address and externally outputting the data together with said PCM group information.

7. The PCM data output device as set forth in claim 6, wherein said packet synchronization means, when PCM data at the head of said PCM group is included in a predetermined number of PCM data, outputs position information indicative of a position of the PCM data at the head in the predetermined number of PCM data at the same timing as that of the output of the predetermined number of PCM data in question, said buffer control means recognizes said PCM data at the head from said position information output from said packet synchronization means and generating an address of said PCM buffer at which the PCM data at the head is written in said PCM buffer, and based on PCM group information output from said packet synchronization means, said PCM data processing means reads said PCM data of said PCM group from said PCM buffer according to said address.

8. The PCM data output device as set forth in claim 6, further comprising address storage means for storing said address, wherein said buffer control means stores, in said address storage means, an address of said PCM buffer at which PCM data at the head is written in said PCM buffer in correlation with said PCM group as head address information, and said PCM data processing means obtains, based on PCM group information output from said packet synchronization means, the corresponding head address information from said address storage means and reads the PCM data from said PCM buffer according to said address.

9. The PCM data output device as set forth in claim 6, wherein said packet synchronization means, when PCM data at the head of a PCM group is included in a predetermined number of PCM data, outputs an existence signal indicative of the existence of said PCM data at the head and position information indicative of a position of the PCM data at the head in the predetermined number of PCM data at the same timing as that of the output of the predetermined number of PCM data in question, said buffer control means, when said existence signal is output, recognizes said PCM data at the head from the then said position information and generates an address of said PCM buffer at which the PCM data at the head is written in said PCM buffer, and based on PCM group information output from said packet synchronization means, said PCM data processing means reads said PCM data of said PCM group from said PCM buffer according to said address.

10. The PCM data output device as set forth in claim 6, further comprising address storage means for storing said address, wherein said packet synchronization means, when PCM data at the head of a PCM group is included in a predetermined number of PCM data, outputs an existence signal indicative of the existence of said PCM data at the head and position information indicative of a position of the PCM data at the head in the predetermined number of PCM data at the same timing as that of the output of the predetermined number of PCM data in question, said buffer control means, when said existence signal is output, recognizes said PCM data at the head from the then said position information, generates an address of said PCM buffer at which the PCM data at the head is written in said PCM buffer and stores, in said address storage means, the address in correlation with said PCM group as head address information, and said PCM data processing means obtains, based on PCM group information output from said packet synchronization means, the corresponding head address information from said address storage means and reads the PCM data from said PCM buffer according to said address.

11. A computer readable memory which stores a PCM data output program for receiving input of a data stream of PCM packets to output PCM data, said PCM data output program comprising the steps of:

receiving input of a PCM data stream made up of a plurality of packets in which PCM groups each composed of a plurality of PCM data follow one after another and in which a header of a packet to which PCM data at the head of each PCM group belongs contains PCM group information of the PCM group in question and providing packet synchronization with respect to the PCM data stream to output PCM data by a predetermined number of the plurality of data, as well as outputting PCM group information from said header, writing said PCM data into a PCM buffer, generating an address in said PCM buffer at which PCM data at the head of said PCM group is written, and based on said group head address, reading PCM data from said PCM buffer and externally outputting the data together with said PCM group information.

12. The computer readable memory as set forth in claim 11, wherein said PCM data output program further comprises the steps of:

when PCM data at the head of said PCM group is included in a predetermined number of PCM data to be written into said PCM buffer, outputting position information indicative of a position of said PCM data at the head in the predetermined number of PCM data, and recognizing said PCM data at the head from said position information.

13. The computer readable memory as set forth in claim 11, wherein said PCM data output program comprising the steps of:

receiving input of said PCM data stream and at the same timing as that of packet synchronization, determining whether said PCM group information is contained in said header, determining whether PCM data at the head of said PCM group is included in a predetermined number of PCM data to be written into said PCM buffer, when PCM data at the head of said PCM group is included in a predetermined number of PCM data to be written into said PCM buffer, outputting an existence signal indicative of the existence of said PCM data at the head and position information indicative of a position of said PCM data at the head in the predetermined number of PCM data at the same timing as that of the output of the predetermined number of PCM data in question, and when said existence signal is output, recognizing said PCM data at the head from the then said position information.

\* \* \* \* \*